US010685309B1

(12) United States Patent
Reddy et al.

(10) Patent No.: US 10,685,309 B1
(45) Date of Patent: Jun. 16, 2020

(54) CASE SYSTEM EVENTS TRIGGERING A PROCESS

(71) Applicant: Open Text Corporation, Waterloo (CA)

(72) Inventors: Satyapal P. Reddy, Fremont, CA (US); Muthukumarappa Jayakumar, Mountain House, CA (US); Ravikumar Meenakshisundaram, Pleasanton, CA (US)

(73) Assignee: Open Text Corporation, Waterloo (CA)

( * ) Notice: Subject to any disclaimer, the term of this patent is extended or adjusted under 35 U.S.C. 154(b) by 387 days.

(21) Appl. No.: 14/502,106

(22) Filed: Sep. 30, 2014

Related U.S. Application Data

(60) Provisional application No. 62/031,590, filed on Jul. 31, 2014.

(51) Int. Cl.
*G06Q 10/06* (2012.01)
*G06F 9/54* (2006.01)
*G06F 9/448* (2018.01)

(52) U.S. Cl.
CPC ....... *G06Q 10/06316* (2013.01); *G06F 9/542* (2013.01); *G06Q 10/067* (2013.01); *G06F 9/4498* (2018.02)

(58) Field of Classification Search
CPC ............ G06Q 10/06316; G06Q 10/067; G06F 17/30011; G06F 17/30943; G06F 17/30309; G06F 17/30221; G06F 17/30589
USPC ................. 705/7.26, 348; 707/695, 755, 829
See application file for complete search history.

(56) References Cited

U.S. PATENT DOCUMENTS

| 5,280,610 | A | | 1/1994 | Travis, Jr. et al. |
| 5,500,802 | A | | 3/1996 | Morris |
| 5,504,892 | A | | 4/1996 | Atsatt et al. |
| 5,907,704 | A | * | 5/1999 | Gudmundson ...... G11B 27/034 717/100 |
| 7,428,699 | B1 | | 9/2008 | Kane |
| 7,792,979 | B1 | * | 9/2010 | Randall .................. G06Q 10/10 707/792 |
| 8,429,605 | B2 | * | 4/2013 | Cruise ................... G06F 9/4498 717/113 |
| 8,578,350 | B2 | * | 11/2013 | Miller ................... G06F 9/4498 717/139 |

(Continued)

OTHER PUBLICATIONS

Vangie Beal, "Web Services", Webopedia.com https://www.webopedia.com/TERM/W/Web_Services.html accessed via archive.org (Year: 2013).*

(Continued)

*Primary Examiner* — Christine M Behncke
*Assistant Examiner* — Shelby A Turner
(74) *Attorney, Agent, or Firm* — Sprinkle IP Law Group

(57) ABSTRACT

Case management systems and techniques are disclosed. In various embodiments, a case model definition with which a case instance is associated is parsed to determine a trigger condition to be monitored for with respect to the case instance and a business process external to the case instance that is to be triggered in the event the trigger condition is satisfied. It is detected with respect to the case instance that the trigger condition is satisfied. The business process is triggered with respect to the case instance, in response to detecting that the trigger condition is satisfied.

19 Claims, 14 Drawing Sheets

(56) References Cited

U.S. PATENT DOCUMENTS

| | | | |
|---|---|---|---|
| 8,706,776 B1 | | 4/2014 | Kraft et al. |
| 9,170,821 B1* | | 10/2015 | Palaniappan ............. G06F 9/44 |
| 9,224,132 B1 | | 12/2015 | Knox et al. |
| 9,411,798 B1 | | 8/2016 | He et al. |
| 9,652,478 B2 | | 5/2017 | Gupta |
| 9,922,059 B1 | | 3/2018 | Reddy et al. |
| 10,467,295 B1 | | 11/2019 | Reddy et al. |
| 1,051,512 A1 | | 12/2019 | Reddy et al. |
| 2001/0054042 A1 | | 12/2001 | Watkins et al. |
| 2002/0104068 A1 | | 8/2002 | Barrett et al. |
| 2003/0018698 A1 | | 1/2003 | Abraham et al. |
| 2003/0055668 A1* | | 3/2003 | Saran ...................... G06F 9/465 705/301 |
| 2003/0088593 A1 | | 5/2003 | Stickler |
| 2004/0163048 A1 | | 8/2004 | McKnight |
| 2004/0215626 A1 | | 10/2004 | Colossi et al. |
| 2005/0010504 A1 | | 1/2005 | Gebhard et al. |
| 2005/0131924 A1 | | 6/2005 | Jones |
| 2006/0200799 A1 | | 9/2006 | Wills |
| 2007/0055692 A1 | | 3/2007 | Pizzo et al. |
| 2007/0233709 A1 | | 10/2007 | Abnous |
| 2007/0294272 A1 | | 12/2007 | Anderson et al. |
| 2008/0307435 A1* | | 12/2008 | Rehman .................. G06F 9/542 719/318 |
| 2009/0007062 A1 | | 1/2009 | Gilboa |
| 2009/0119594 A1 | | 5/2009 | Hannuksela |
| 2009/0171897 A1 | | 7/2009 | Spinola |
| 2009/0222793 A1* | | 9/2009 | Frank ...................... G06F 9/542 717/114 |
| 2009/0287658 A1 | | 11/2009 | Bennett |
| 2009/0326694 A1 | | 12/2009 | Stephens |
| 2010/0070561 A1* | | 3/2010 | Dhoolia ................. G06F 15/16 709/203 |
| 2010/0161362 A1* | | 6/2010 | Shapira .................. G06Q 10/00 705/7.11 |
| 2010/0162260 A1* | | 6/2010 | Ibrahim .................. G06F 9/505 718/105 |
| 2010/0251264 A1* | | 9/2010 | McGuire ............ G06Q 10/0637 719/317 |
| 2010/0299678 A1* | | 11/2010 | Taylor .................... G06F 9/542 719/318 |
| 2010/0306638 A1 | | 12/2010 | Oleksy |
| 2010/0325144 A1 | | 12/2010 | Fischer et al. |
| 2011/0246444 A1* | | 10/2011 | Jenkins ................ G06Q 10/063 707/711 |
| 2011/0270740 A1 | | 11/2011 | Pickett |
| 2012/0131445 A1 | | 5/2012 | Oyarzabal et al. |
| 2012/0185791 A1 | | 7/2012 | Claussen et al. |
| 2013/0151535 A1 | | 6/2013 | Dusberger et al. |
| 2013/0262522 A1 | | 10/2013 | van Rotterdam et al. |
| 2014/0114671 A1 | | 4/2014 | Hu et al. |
| 2014/0114673 A1 | | 4/2014 | Hu |
| 2014/0330612 A1* | | 11/2014 | Lemcke ........... G06Q 10/06316 705/7.26 |
| 2015/0278717 A1 | | 10/2015 | Pasupathi |
| 2016/0004565 A1* | | 1/2016 | Harper .................. G06F 9/4881 718/102 |
| 2016/0019243 A1 | | 1/2016 | Kamel et al. |
| 2020/0026736 A1 | | 1/2020 | Reddy et al. |
| 2020/0117644 A1 | | 4/2020 | Reddy et al. |

OTHER PUBLICATIONS

"Publish-subscribe pattern", Wikipedia.org https://en.wikipedia.org/wiki/Publish%E2%80%93subscribe_pattern accessed via archive.org (Year: 2014).*

Wei-Dong Zhu et al. "Advanced Case Management with IBM Case Manager", ibm.com/redbooks, Fourth Edition (May 2014) (Year: 2014).*

Office Action for U.S. Appl. No. 14/502,132, dated Nov. 18, 2016, 8 pgs.

Office Action for U.S. Appl. No. 14/502,066, dated Jan. 27, 2017, 15 pgs.

Office Action for U.S. Appl. No. 15/502,159, dated Jan. 30, 2017, 52 pgs.

Office Action for U.S. Appl. No. 14/502,025, dated May 17, 2017, 19 pgs.

Notice of Allowance for U.S. Appl. No. 14/502,066, dated May 23, 2017, 2 pgs.

Office Action for U.S. Appl. No. 14/502,132, dated Jun. 19, 2017, 12 pgs.

Notice of Allowance for U.S. Appl. No. 14/502,066, dated Aug. 10, 2017, 7 pgs.

Office Action for U.S. Appl. No. 14/502,159, dated Aug. 31, 2017, 70 pgs.

Office Action for U.S. Appl. No. 14/502,322, dated May 1, 2017, 13 pages.

Office Action for U.S. Appl. No. 14/502,361, dated Jun. 28, 2017, 13 pages.

Office Action for U.S. Appl. No. 14/502,281, dated Oct. 7, 2016, 12 pages.

Office Action for U.S. Appl. No. 14/502,281, dated Jul. 12, 2017, 17 pages.

Office Action for U.S. Appl. No. 14/502,322, dated Oct. 6, 2017, 14 pages.

Office Action for U.S. Appl. No. 14/502,132, dated Nov. 21, 2017, 17 pages.

Office Action for U.S. Appl. No. 14/502,025, dated Dec. 4, 2017, 31 pages.

Office Action for U.S. Appl. No. 14/502,281, dated Dec. 14, 2017, 22 pages.

Notice of Allowance for U.S. Appl. No. 14/502,066, dated Nov. 29, 2017, 5 pages.

Office Action for U.S. Appl. No. 14/502,361, dated Jan. 8, 2018, 24 pages.

Office Action for U.S. Appl. No. 14/502,132, dated May 18, 2018, 16 pages.

Office Action for U.S. Appl. No. 14/502,281, dated Jun. 19, 2018, 10 pages.

Sieber, What Is an XML File & What Are Its Uses? [In Case You Were Wondering], Aug. 10, 2010, retrieved from :https://www.makeuseof.com/tag/xml-file-case-wondering/ on Jun. 18, 2018.

Office Action for U.S. Appl. No. 14/502,361, dated Jul. 3, 2018, 24 pages.

Office Action for U.S. Appl. No. 14/502,025, dated May 29, 2018, 32 pages.

Notice of Allowance for U.S. Appl. No. 14/502,132, dated Oct. 9, 2018, 3 pgs.

Office Action for U.S. Appl. No. 14/502,322, dated Dec. 7, 2018, 14 pgs.

Office Action for U.S. Appl. No. 14/502,025, dated Dec. 21, 2018, 36 pgs.

Notice of Allowance for U.S. Appl. No. 14/502,361, dated Dec. 28, 2018, 5 pgs.

Notice of Allowance for U.S. Appl. No. 14,502,281, dated Dec. 31, 2018, 4 pgs.

Notice of Allowance for U.S. Appl. No. 14/502,132, dated Feb. 7, 2019, 3 pgs.

Office Action issued for U.S. Appl. No. 14/502,025, dated Apr. 12, 2019, 33 pgs.

Notice of Allowance issued for U.S. Appl. No. 14/502,322, dated May 1, 2019, 11 pgs.

Natividade-Jesus, Eduardo, Joao Coutinho-Rodrigues, and Carlos Henggeler Antunes. "A multicriteria decision support system for U housing evaluation." Decision Support Systems 43.3 (2007): 779-790.

Ho, Daniel, Graeme Newell, and Anthony Walker. "The importance of property-specific attributes in assessing CBD office building V quality." Journal of Property Investment & Finance 23.5 (2005): 424-444.

Notice of Allowance issued for U.S. Appl. No. 14/502,132, dated May 17, 2019, 6 pgs.

Notice of Allowance issued for U.S. Appl. No. 14/502,361, dated May 30, 2019, 6 pgs.

Notice of Allowance issued for U.S. Appl. No. 14/502,281, dated Jun. 12, 2019, 5 pgs.

(56) References Cited

OTHER PUBLICATIONS

Office Action issued for U.S. Appl. No. 14/502,025, dated Aug. 7, 2019, 32 pgs.
Notice of Allowance issued for U.S. Appl. No. 14/502,132, dated Sep. 4, 2019, 6 pages.
Notice of Allowance issued for U.S. Appl. No. 14/502,361, dated Sep. 16, 2019, 6 pages.
Notice of Allowance issued for U.S. Appl. No. 14/502,322, dated Dec. 30, 2019, 11 pages.
Dobrovolskiene, Nomeda et al., "Developing a Composite Sustainability Index for Real Estate Projects Using Multiple Criteria Decision Making," Operational Research 19.3, 2019, pp. 617-635.
Notice of Allowance issued for U.S. Appl. No. 14/502,361, dated Jan. 8, 2020, 8 pages.
Office Action issued for U.S. Appl, No. 14/502,025, dated Jan. 13, 2020, 32 pages.

* cited by examiner

CASE SYSTEM EVENTS TRIGGERING A PROCESS

CROSS REFERENCE TO OTHER APPLICATIONS

This application claims priority to U.S. Provisional Patent Application No. 62/031,590, entitled CASE MODEL CREATION, CONTENT, AND BEHAVIOR, filed Jul. 31, 2014, which is incorporated herein by reference for all purposes.

BACKGROUND OF THE TECHNOLOGY

Case management systems, software, and/or cloud-based or other electronically-provided case management services (collectively, "Case Management Systems") are used to automate the management of complex sets of documents or other content and associated business or other processes, particularly in situations in which the documents or other content that may need to be managed for respective particular instances of a case model/type (e.g., a loan application) may not be the same for each instance and the processing required and/or selected to be performed may not be the same for each instance.

A case model ("Case Model") typically describes a type of case, instances of which are to be managed by a Case Management System. As opposed to very structured business process that defines a predetermined work flow that does not vary from instance to instance, using a Case Model one can model ad hoc actions and define responses thereto with mini workflows, enabling the processing of respective instances of a Case Model to be determined dynamically at runtime based, e.g., on events, context data, user input, dynamic evaluation of documents or other content, etc. As a result, each instance of a Case Model (e.g., the respective loan applications of different applicants) may follow its own course as determined at each step by processing as defined in applicable portions of the Case Model.

BRIEF DESCRIPTION OF THE DRAWINGS

Various embodiments of the technology are disclosed in the following detailed description and the accompanying drawings.

DETAILED DESCRIPTION

The technology can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details.

A case management system that triggers business processes is disclosed. In various embodiments, a case management system can generate events or other communications to trigger processes external to a case management instance. For example, an event may be triggered by state or other contextual data associated with a case instance. The case management system may create and transmit an event as defined in a case model definition. An business process and/or agent associated with the business process may be configured to "listen" for the event, and/or otherwise to receive and respond to the event. In some embodiments, an event payload may be used by the business process to perform actions in response to the event. Examples of business processes that may be triggered by a case instance, in various embodiments, include without limitation sending a notification; creating and storing a record; creating or modifying a document; and obtaining, for example via a call to an external service, a response data and returning the response data to the case instance that generated the event that triggered the business process.

Figure 1:
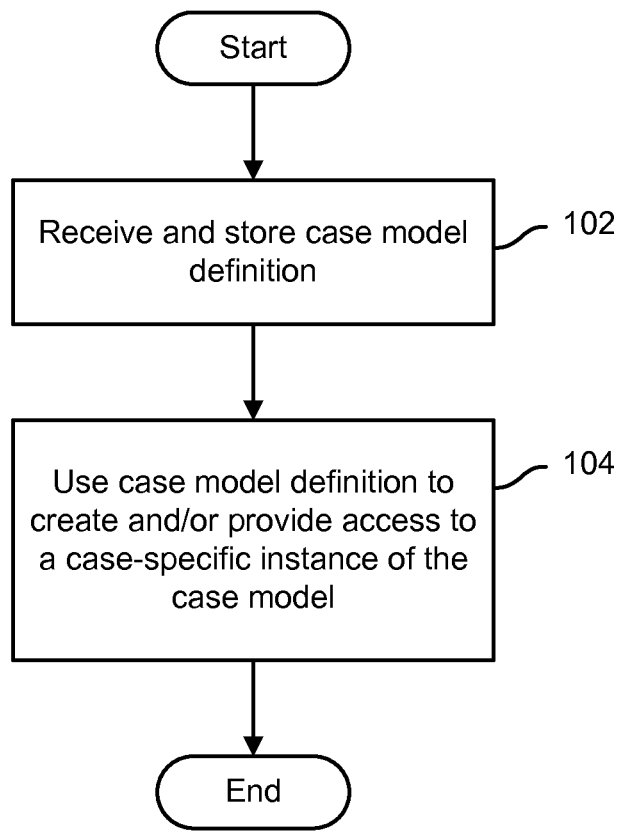
FIG. 1 is a flow chart illustrating an example embodiment of a process to perform case management.

FIG. 1 is a flow chart illustrating an embodiment of a process to perform case management. In the example shown, a case model definition is received and stored (102). The case model definition is used to create new instances based on the case model, sometimes referred to herein as "case instances" or "case management instances", and/or to provide access to previously-created instances (104). For example, a case model may be defined and stored for a loan application and associated processes. Case instances may be created based on the case model and each respective case instance used to manage a corresponding loan application, for example by different respective loan applicants.

A case model typically describes a case management system. Using a case model, one can model ad hoc actions with mini workflows, for example, as opposed to very structured process that defines an end-to-end business workflow. In various embodiments, a case model comprises a hierarchical/nested container model (sometimes referred to herein as a "hierarchical data model"), and may in addition define case roles, case phases (states), and/or permissions. In some embodiments, permissions may be defined for each case node and/or level in the hierarchy, and may vary in some embodiments based at least in part on the respective phases (states) of a state machine defined for a case node.

In various embodiments, a case model may include a hierarchical/nested container model. This model represents how the data with in a case is organized and what data is captured during runtime. Each node in the hierarchy is sometimes referred to herein as a "case node". Case nodes at the lowest level of a case model hierarchy may be referred to as "case leaf nodes" or simply "leaf nodes". "Case leaf nodes" in various embodiments may point to a specific business object or document type.

The term "case role" is used herein to refer to user roles that have been defined in a case model. In various embodiments, users may be assigned to case roles with respect to instances of a case model, and at each case node in the case model permissions may be designated by reference to one or more case roles. During runtime in some embodiments members may be added or removed from these roles at case node instances corresponding to respective instances of a type of case as defined in a case model.

In various embodiments, at each case node a metadata model that defines one or more traits and/or associated behavior may be defined.

In various embodiments, a case model as described herein may be created using a domain-specific or other development module or tool. For example, reusable elements, such sample case nodes typical of those used in the domain (e.g., documents, case roles, behaviors, etc. Typically associated with a loan application process, a new drug approval application, etc.), primitives usable to define a state machine and/or associated processing for respective case nodes, etc., may be provided. For example, an application programming interface (API) may be defined, and/or a visual or other case model development tool may be provided.

In various embodiments, a case model definition is embodied in an eXtensible Markup Language (XML) or other structured data file. A case management system and/or platform is provided, which is configured (e.g., by software) to load a case model definition, parse the definition, and create an instance of the case model based on the definition. Instance-specific attributes and/or state information or other metadata may be stored in a case model instance data store, e.g., a database. At runtime, the case model definition file and the case model instance data for a given instance are used by the disclosed case management system to implement the case model instance, including by performing processing and managing case model instance associated content per the case model definition, in light of the current values of the case model instance data for that instance.

Figure 2:
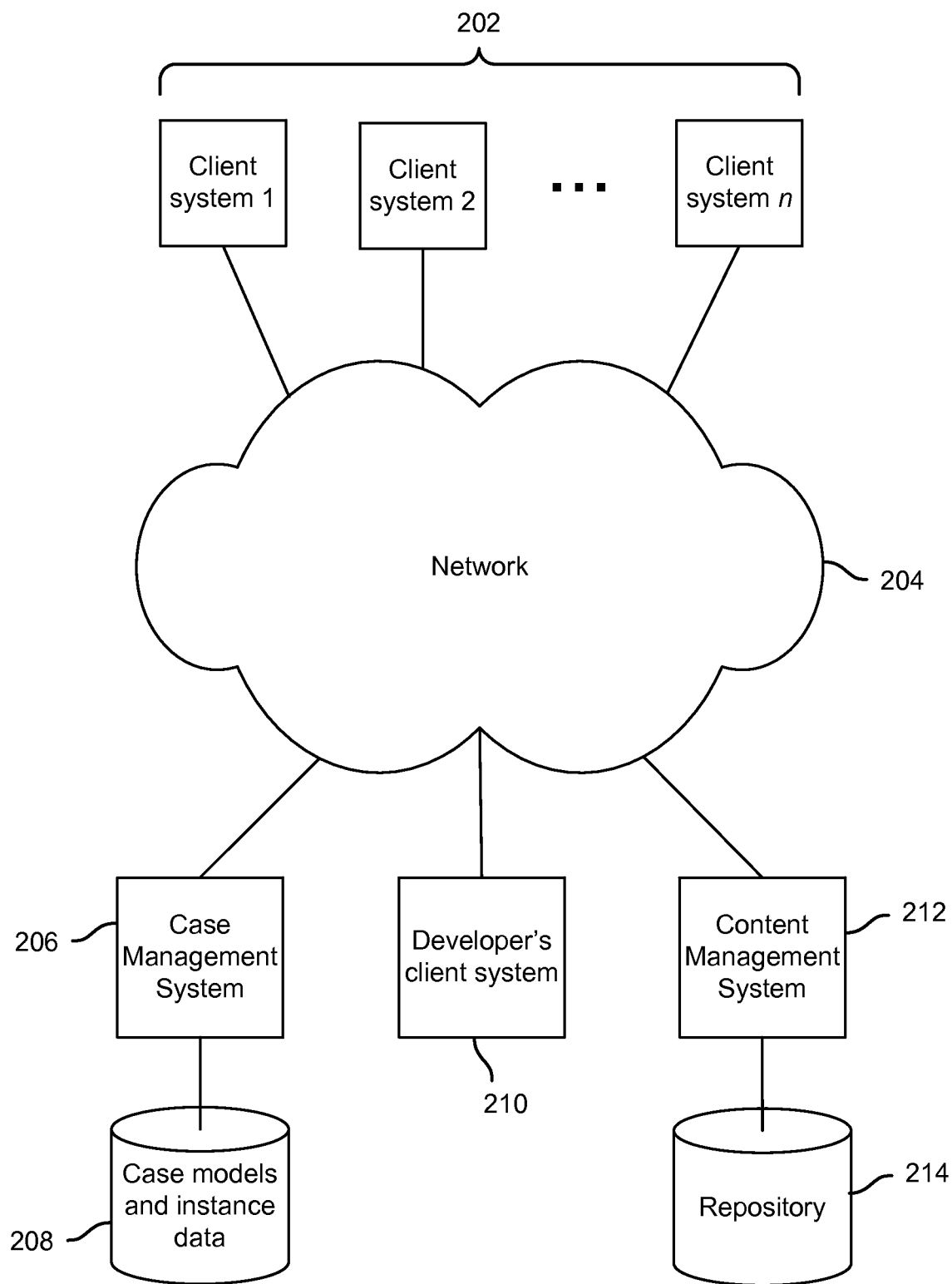
FIG. 2 is a block diagram illustrating an example embodiment of a case management system and environment.

FIG. 2 is a block diagram illustrating an embodiment of a case management system and environment. In the example shown, client systems 202 are connected via a network 204, e.g., the Internet, to a case management system 206. In various embodiments, the case management system 206 may be configured to implement the process of FIG. 1. Case management system 206 uses case models stored in data storage 208 to provide case management services with respect to case management instances, the instance variable data values of which also are stored, in this example, in data storage 208. For example, one or more of clients 202 may connect via network 204 to case management system 206 to obtain access to case management services. For example, case management system 206 may expose a "case management system as a service", e.g., as a web service, enable clients 202 to connect to case management system 206, create case management instances based on case models stored in data storage 208. The users of client system 202 may be prompted to provide data values and/or other user input to populate case management instances with metadata, user data, documents, etc., and/or such other user input as may be required to advance case instances through case management processing as defined in the case model.

In the example shown in FIG. 2, a case model developer system 210, e.g., a client computer system, also can connect to case management system 206 via network 204. In some embodiments, a case model development user interface and/or service may be accessed and used to define a case model. For example, a visual or other developer tool may be presented to enable a developer using client system 210 to define a case model and cause the case model to be stored in data storage 208 and deployed by case management system 206. In some embodiments, deployment of a case model includes making the case model available to be used to create case management instances based on the model, and to use the case model to perform with respect to each such instance the case management processing as defined in the case model.

In various embodiments, a case model may indicate one or more content objects to be associated with respective instances of a case model. The case model may include metadata and associated behaviors to enable instance-specific content objects (e.g., documents) to be associated with case leaf nodes of a case instance. In the example shown in FIG. 2, content objects may be accessed via a content management system 212 configured to manage content objects stored in an associated content repository 214. In various embodiments, case management system 206 may be configured to use instance variables associated with a given case instance and metadata and/or behaviors defined in an associated case model to interact programmatically with content management system 212 to obtain and/or manage documents or other content objects associated with a case instance. In some embodiments, case management system 206 may be configured, e.g., via the case model, to invoke services and/or other functionality of content management system 212 with respect to such documents or other content objects.

Figure 3:
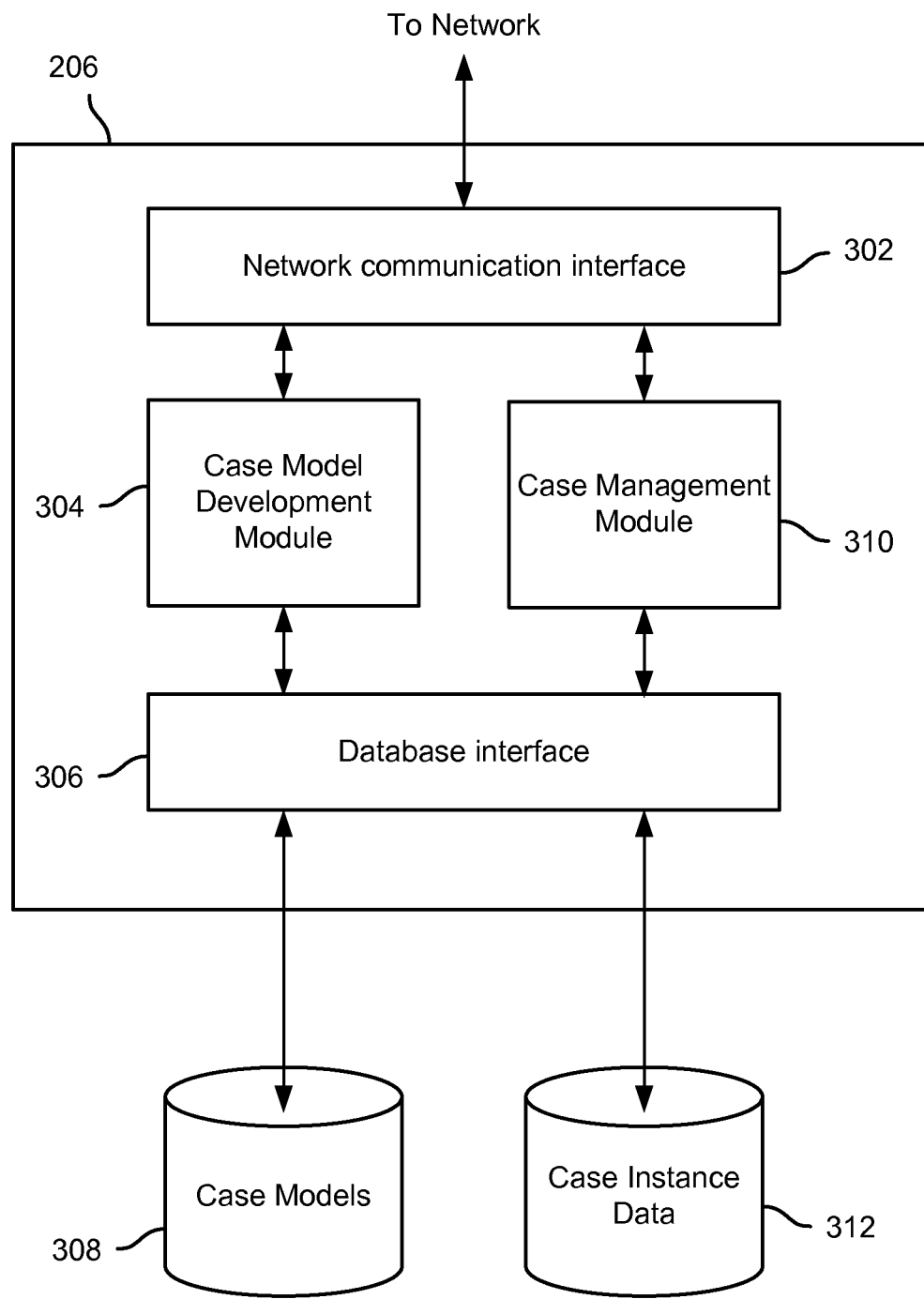
FIG. 3 is a block diagram illustrating an example embodiment of a case management system.

FIG. 3 is a block diagram illustrating an embodiment of a case management system. In some embodiments, the case management system of FIG. 3 corresponds to case management system 206 of FIG. 2. In the example shown, case management system 206 includes a network communication interface 302, such as a wireless or other network interface card, to provide network connectivity, e.g., to network 204 of FIG. 2. A case model development module 304 is accessible to developers via network communication interface 302 and may be used to create and/or modify case model definitions. In some embodiments, a visual or other user interface is provided, via network communication interface 302, to enable case models to be created and/or modified. For example, a developer may use a browser to access the developer user interface in some embodiments. Case model definitions are stored by case model development module 304 by using a backend database (or other data storage) interface 306 to store the case model(s) in case model store 308.

Referring further to FIG. 3, the case management system 206 includes a case management module 310. In various embodiments, case management module 310 includes functionality to enable users, e.g., users of client systems 202 of FIG. 2, to create and/or use case management instances based on case models stored in case model store 308. Case management module 310, for example, may expose a web or other interface to remote users and may receive via said interface a request to create and/or access a case instance. Case management module 310 uses database interface 306 to obtain an associated case model definition from case model store 308, to use the case model to instantiate case instances. Instance variables are stored by case management module 310 in case instance data store 312.

Figure 4:
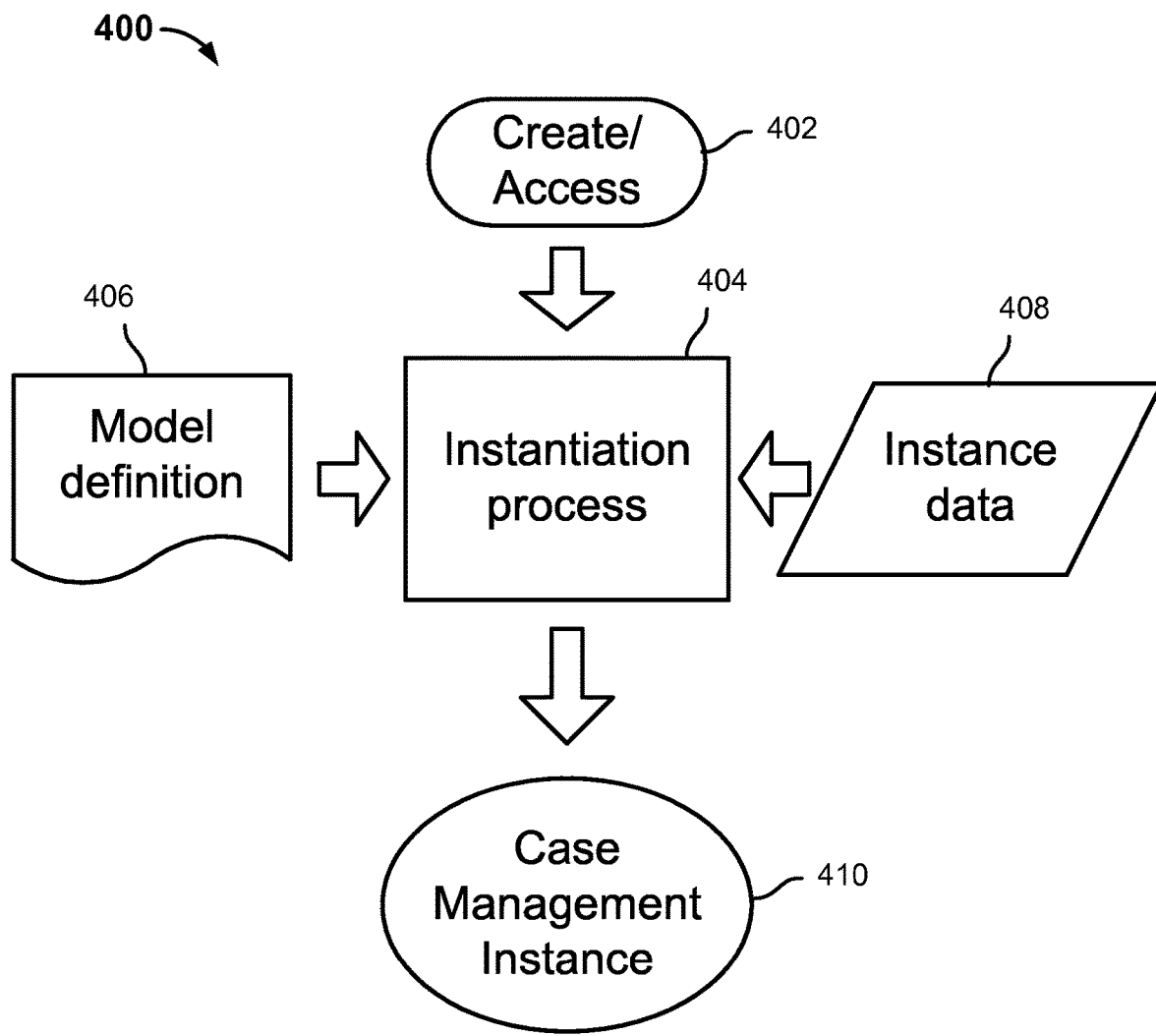
FIG. 4 is a diagram illustrating an example embodiment of a process and system to create and/or provide access to case management instances.

FIG. 4 is a diagram illustrating an embodiment of a process and system to create and/or provide access to case management instances. In some embodiments, the process of FIG. 4 may be implemented by a case management system and/or a component thereof, such as case management module 310 of FIG. 3. In the example shown, case management system 400 receives a request 402 to create or access a case management instance and invokes instantiation process 404. Instantiation process 404 uses a case model definition 406 associated with the request, e.g., a case model indicated explicitly and/or otherwise associated with data comprising the request 402, and case management instance data 408 associated with the case management instance, to instantiate and provide access to a case management instance 410.

In various embodiments, a case model definition such as model definition 406 may include an XML file or other structured data, which the case management system is configured to parse and use to construct case instances based on the case model. For example, the hierarchical data structure may be defined, along with metadata and associated behaviors for each case node. A case management instance, such as case management instance 410, may include an in memory instance of a data structure defined in case model definition 406, which is used to store instance variables, such as instance data 408 in this example.

Figure 5:
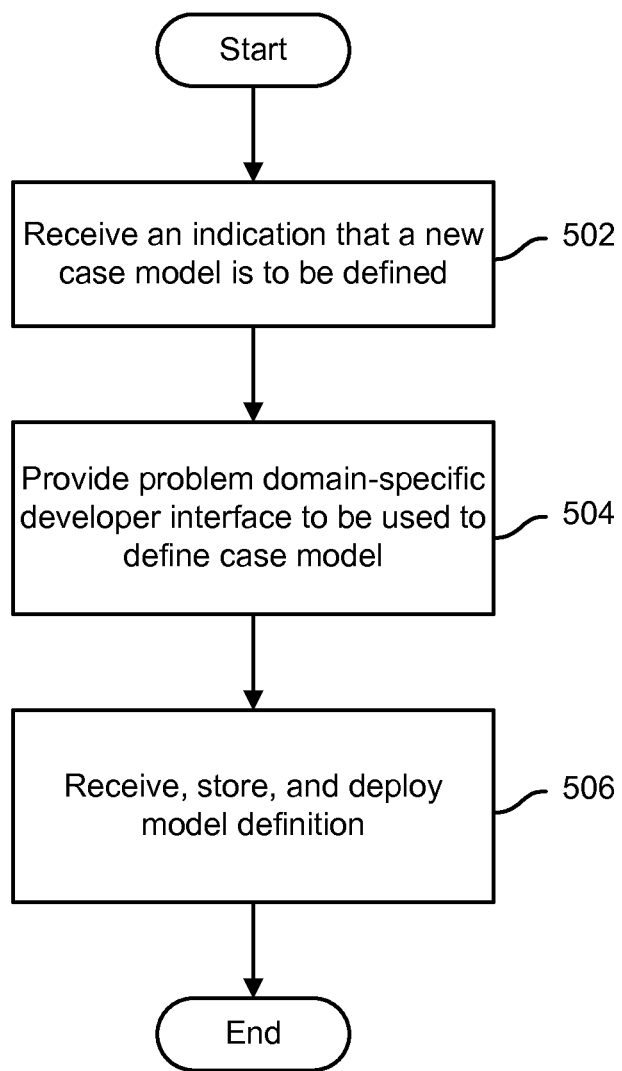
FIG. 5 is a flow chart illustrating an example embodiment of a process to receive and store a case model.

FIG. 5 is a flow chart illustrating an embodiment of a process to receive and store a case model. In some embodiments, the process of FIG. 5 is used to implement step 102 of FIG. 1 and is performed by a case management system, such as case management system 206 of FIG. 2, e.g., case model development module 304 of FIG. 3. In the example shown, an indication that a new case model is to be defined is received (502). A problem domain-specific developer interface to be used to define the case model is provided (504). For example, in some embodiments a developer may indicate in a request to define a new case model, and/or may be prompted to indicate, a "problem domain" with which the case model is associated, such as a loan application, an employment application, a product development or other business project, a healthcare or other patient, a claim for reimbursement or benefits, or a matter being handled by a professional or personal service provider, such as a lawsuit, home renovation project, etc. In various embodiments, the problem domain-specific developer interface provides access to problem domain-specific elements to assist the developer in defining the case model. For example, a loan application typically is initiated by a loan applicant submitting an application, and typically involves gathering information to verify and evaluate the applicant's identity, financial assets, income, creditworthiness, etc. In some embodiments, a template may be provided to be used as a starting point. The developer uses visual or other tools to customize the template as desired to define a case model.

Once the developer has completed and submitted the case model definition, the case model definition is received, stored, and deployed (506). In some embodiments, a runtime representation of the definition is processed, e.g., upon submission by the developer, to generate an XML or other structured data file that embodies the case model as defined. Deployment in various embodiments includes making the case model definition available to be used to instantiate case management instances based on the case model, e.g., individual loan application cases.

Figure 6:
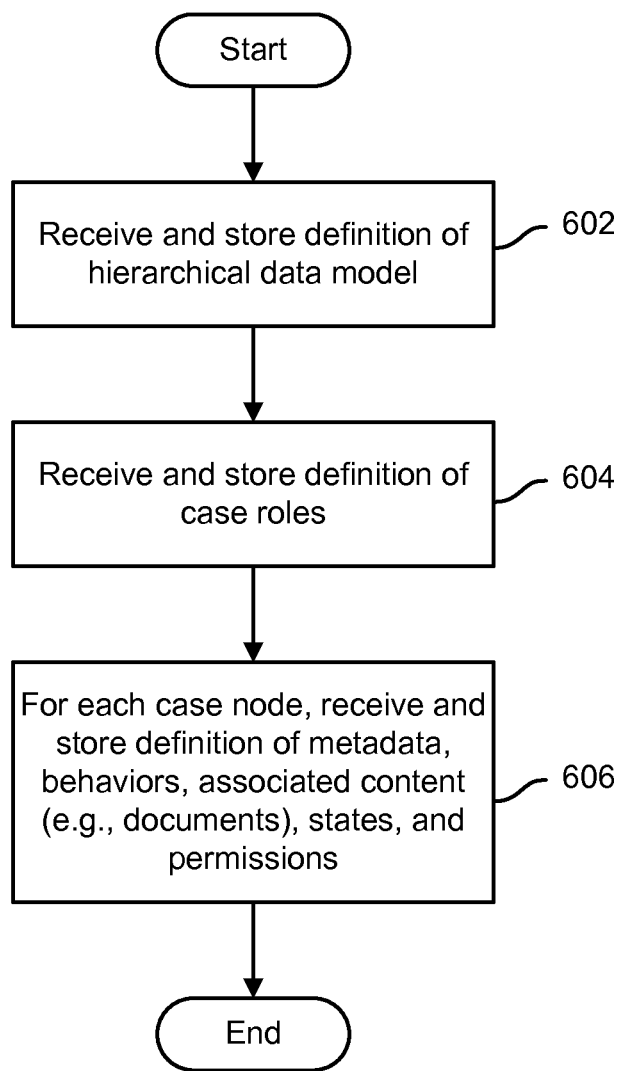
FIG. 6 is a flow chart illustrating an example embodiment of a process to receive and store a case model.

FIG. 6 is a flow chart illustrating an embodiment of a process to receive and store a case model. In some embodiments, the process of FIG. 6 is included in step 506 of FIG. 5. In the example shown, a definition of a hierarchical/nested data model is received (602). For example, a user interface that enables a developer to drag and drop case nodes onto a canvass and to indicate hierarchical relationships between case nodes may be provided and used by the developer to define a hierarchical/nested data model. A definition of case roles is received and stored (604). For example, a "loan application" case model may include user roles such as "loan initiator", "underwriter", "appraiser", etc. For each case node in the hierarchical/nested data model, a definition of metadata, behaviors, content (e.g., documents), states/phases (and transitions between states/phases), and/or permissions (e.g., by case role) is received (606). For example, in various embodiments a developer interface may be provided to enable a developer to select a case node and be presented with an interface to define a state machine for that case node.

Figure 7:
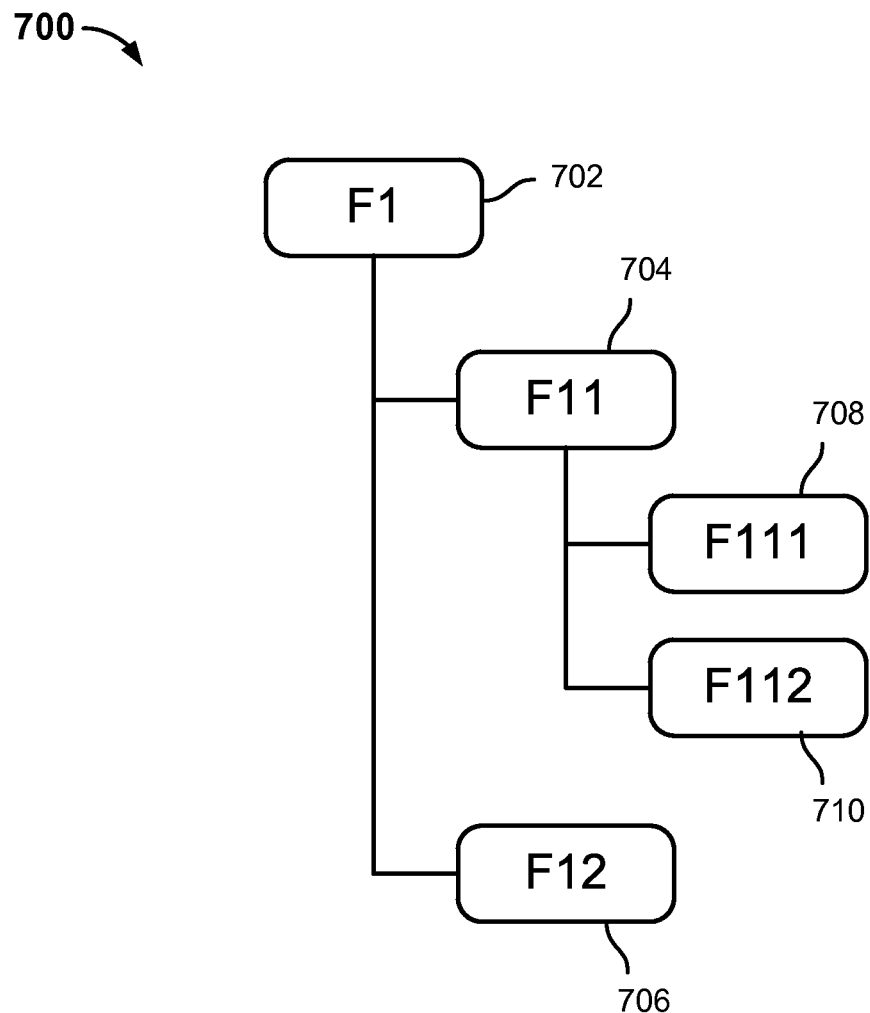
FIG. 7 is a block diagram illustrating an example of a hierarchical data model in an embodiment of a case management system.

FIG. 7 is a block diagram illustrating an example of a hierarchical data model in an embodiment of a case management system. In various embodiments, a case model, such as one defined using the processes of FIGS. 5 and 6, may include a hierarchical/nested container model, such as the one shown in FIG. 7. In the example shown, hierarchical/nested container model 700 includes a root node 702 at a first (highest) hierarchical level. At a first hierarchical level below the root node, nodes 704 and 706 are included. Finally, in a lowest hierarchical level (in this example), node 704 has two "case leaf nodes" 708 and 710. In various embodiments, metadata, behaviors, permissions, etc. that have been defined for a case node extend (or in some embodiments may at the option of the case model developer be extended) to child case nodes of the case node at which such metadata, behaviors, permissions, etc. have been defined.

Figure 8:
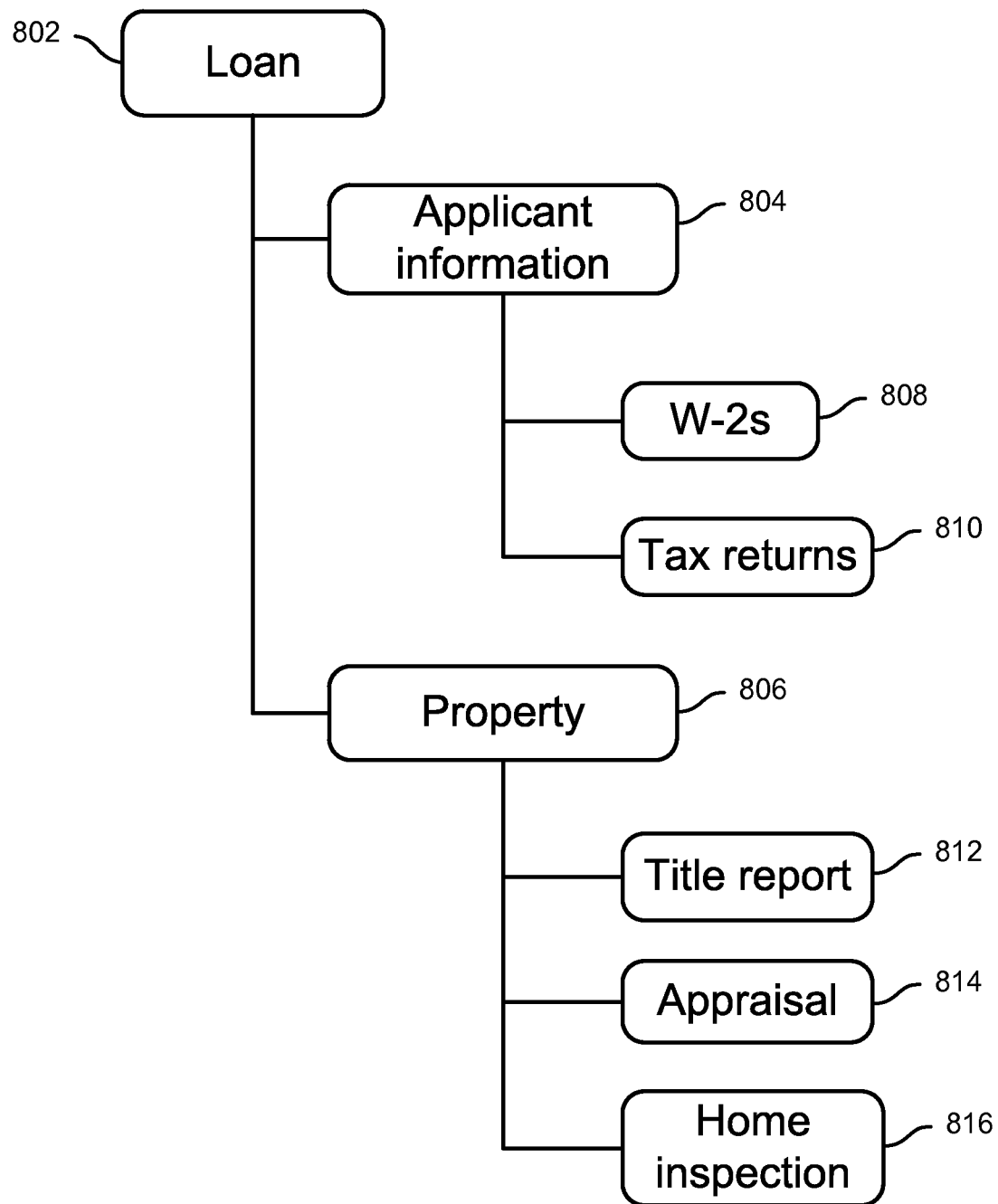
FIG. 8 is a block diagram illustrating an example of a hierarchical data model in an embodiment of a case management system

FIG. 8 is a block diagram illustrating an example of a hierarchical data model in an embodiment of a case management system, such as case management system 206 of FIG. 2. In particular, a hierarchical/nested container model for a home loan application is illustrated. In the example shown, each instance of a "loan" case includes a root node 802 and two first level sub-nodes 804 and 806, in this example one (804) for financial information of the applicant and associated processing, and another (806) for information and processing associated with the home to be purchased using the loan. The "applicant information" sub-node 804 includes a first case leaf node 808 for Forms W-2 and a second case leaf node 810 for the applicant's tax returns. "Property" sub-node 806 includes case leaf nodes 812, 814, and 816 for the title report, appraisal report, and home inspection report, respectively. In various embodiments, the case model definition may include for each case node a definition of metadata and/or behaviors for that case node. For case leaf nodes, such as case leaf nodes 808, 810, 812, 814, and 816, the case model definition may include information regarding documents or other content objects to be associated with such nodes, including in some embodiments an identification of a storage location in which such documents are to be stored, e.g., in a content repository such as repository 214 of FIG. 2 associated with a content management system such as content management system 212 of FIG. 2.

Figure 9:
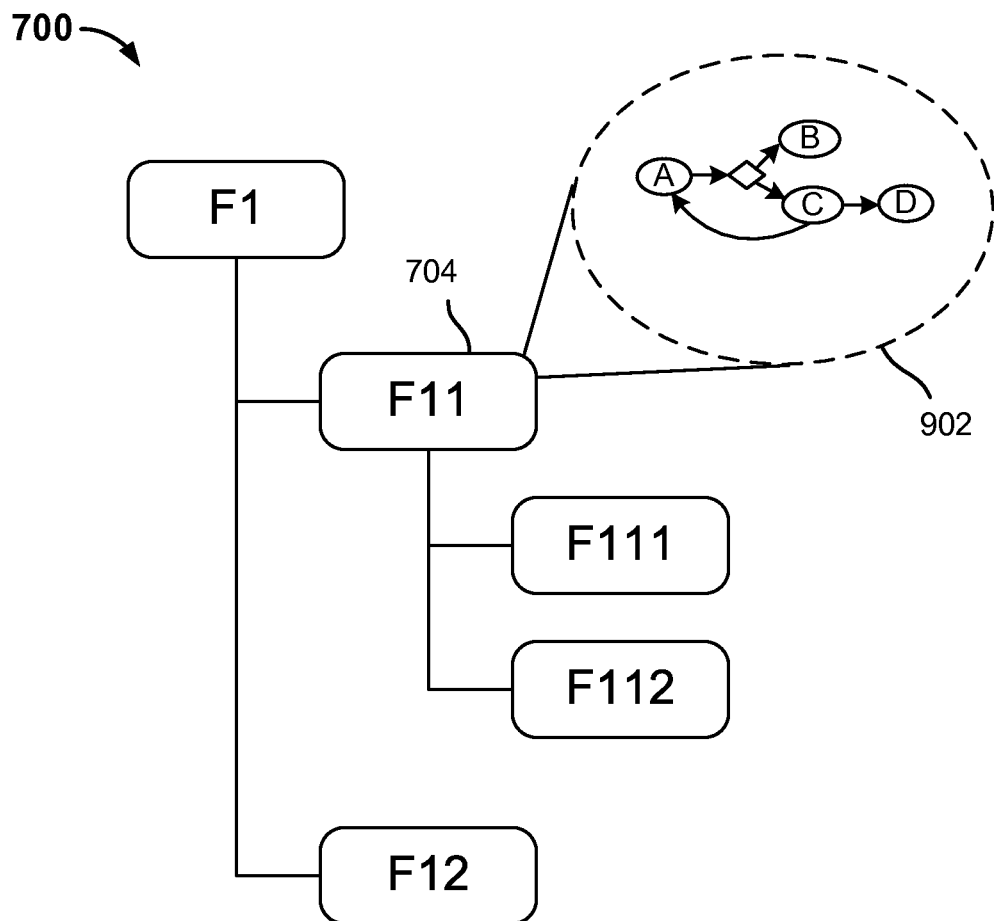
FIG. 9 is a block diagram illustrating an example of a hierarchical data model and associated state machine in an embodiment of a case management system.

FIG. 9 is a block diagram illustrating an example of a hierarchical data model and associated state machine in an embodiment of a case management system. In various embodiments, the hierarchical data model and associated state machine of FIG. 9 may be included in a case model definition defined and/or deployed via a case management system such as case management system 206 of FIGS. 2 and 3. In the example shown, a state machine 902 has been defined for and associated with case node 704 of hierarchical/nested container model 700 of FIG. 7.

In various embodiments, for any case node within the hierarchical/nested container model, a state machine can be defined and the actions that can be used to transition between different phases/states of the state machine defined for that case node may be specified. These actions could be used during runtime to transition between states.

In the example shown in FIG. 9, a state machine 902 has been defined and associated with a specific case node in the hierarchical model shown in FIG. 7, specifically node "F11" (704). In various embodiments, a document or other content associated with node "F11"; traits, such as metadata and/or associated behavior associated with node "F11"; etc. may be transformed, reviewed, and/or otherwise involved with processing that may result, in a given case model instance, in transitions being made between states of the state machine 902 defined for case node "F11" in this example.

In various embodiments, enabling a state machine to be defined and associated with a case node comprising a hierarchal/nested container model provides a flexible, dynamic framework within which ad hoc actions and/or information can be responded to, in a manner determined dynamically based on the circumstances of a given instance of a case, with the result that the actions and/or processing performed at a given case node, and/or the consequences of such actions and/or processing, may be different for one instance of the case model than for another instance of the case model.

In various embodiments, a state machine engine may be included in a case management system, such as case management system 206 of FIG. 2, to enable a state machine defined for a case node, such as state machine 902 of FIG. 9, to be implemented and associated functionality to be provided. For example, in some embodiments, case management module 310 of FIG. 3 may include a state machine engine. In some embodiments, the state machine engine may receive and parse state machine definition portions of a case model definition, and may use such portions to create and manage runtime data structures associated with the respective defined states (phases) of the state machine and transitions between them. In some embodiments, state variables associated with a current state of a case node-specific state machine for a given instance of a case model may be stored persistently with other case management instance data, for example in a case instance data store such as data store 312 of FIG. 3.

Figure 10:
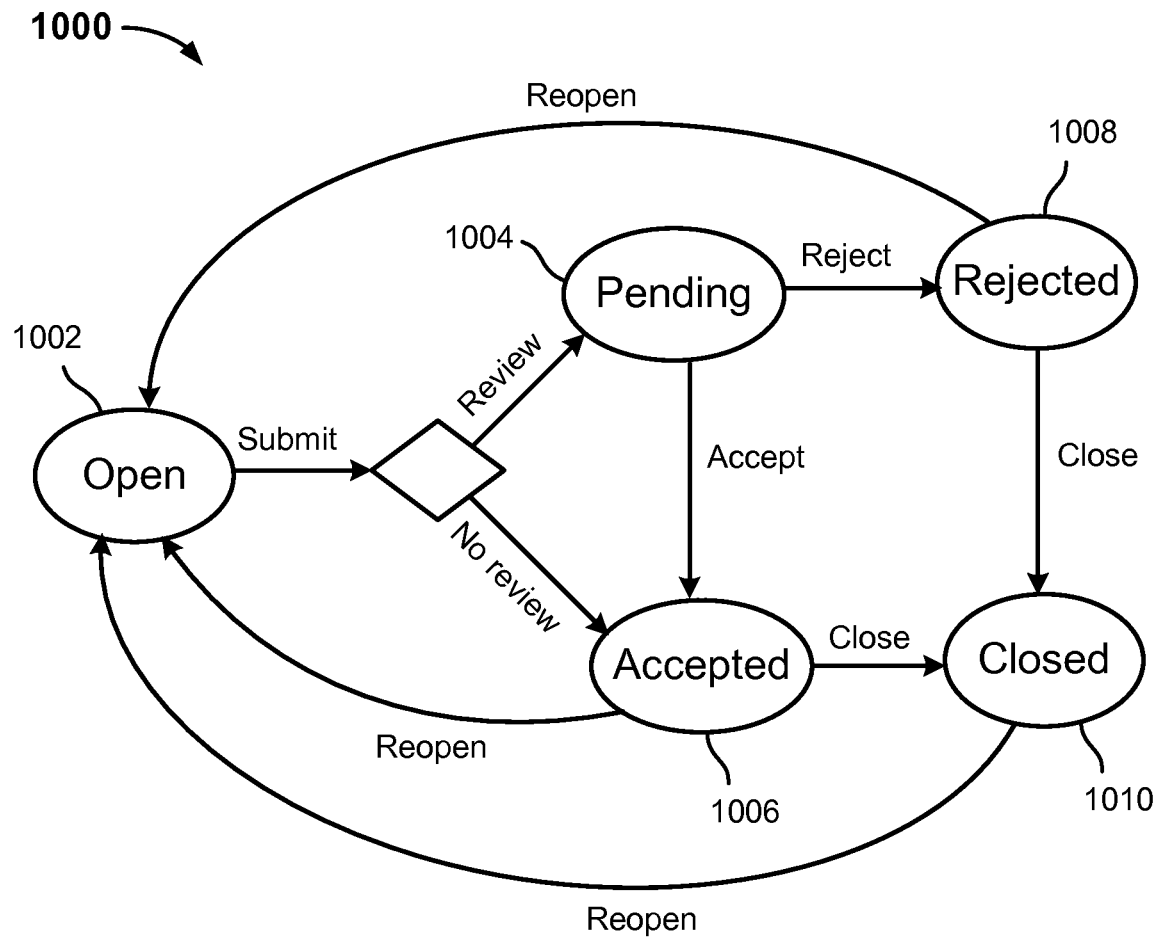
FIG. 10 is a block diagram illustrating an example of a state machine defined for a case node in an embodiment of a case management system.

FIG. 10 is a block diagram illustrating an example of a state machine defined for a case node in an embodiment of a case management system. In various embodiments, the state machine of FIG. 10 may be included in a case model definition defined and/or deployed via a case management system such as case management system 206 of FIGS. 2 and 3. In the example shown, state machine 1000 includes an "open" state 1002, associated for example with beginning processing of a received document, such as one created locally, uploaded, or otherwise provided by a user. In the example shown, a transition out of the "open" state 1002 may occur upon a "submit" option being selected, e.g., by a user, a business process, an external service, etc. If the item was submitted with an indication that a "review" is required (e.g., a reviewer is named or otherwise indicated), the state machine transitions to a "pending" state 1004, indicating the required review is pending. If no review is required, the state machine instead transitions directly to an "accepted" state 1006. If review was required and the reviewer "accepts" the item, a transition from "pending" state 1004 to "accepted" state 1006 occurs. If instead the reviewer were to "reject" the item, in this example a transition from "pending" state 1004 to "rejected" state 1008 would occur. From either "accepted" state 1006 or "rejected" state 1008, a "close" transition to a "closed" state 1010 could occur. Finally, in this example, "reopen" transitions back to "open" state 1002 could occur from the "accepted" state 1006, "rejected" state 1008, and/or "closed" state 1010.

Note that for a given instance of a case model with which the state machine 1000 of FIG. 10 is associated, the states through which the state machine 1000 of FIG. 10 may transition for that instance may be different than for one or more other instances. Also, for a given instance, depending on the state machine definition included in the case model definition, the user data associated with that instance at applicable times, and potentially user actions and decisions made in response to case information, the state machine 1000 may be transitioned to/through a given state more than once (e.g., via the "reopen" transitions), potentially resulting in different outcomes of processing associated with that state.

Figure 11:
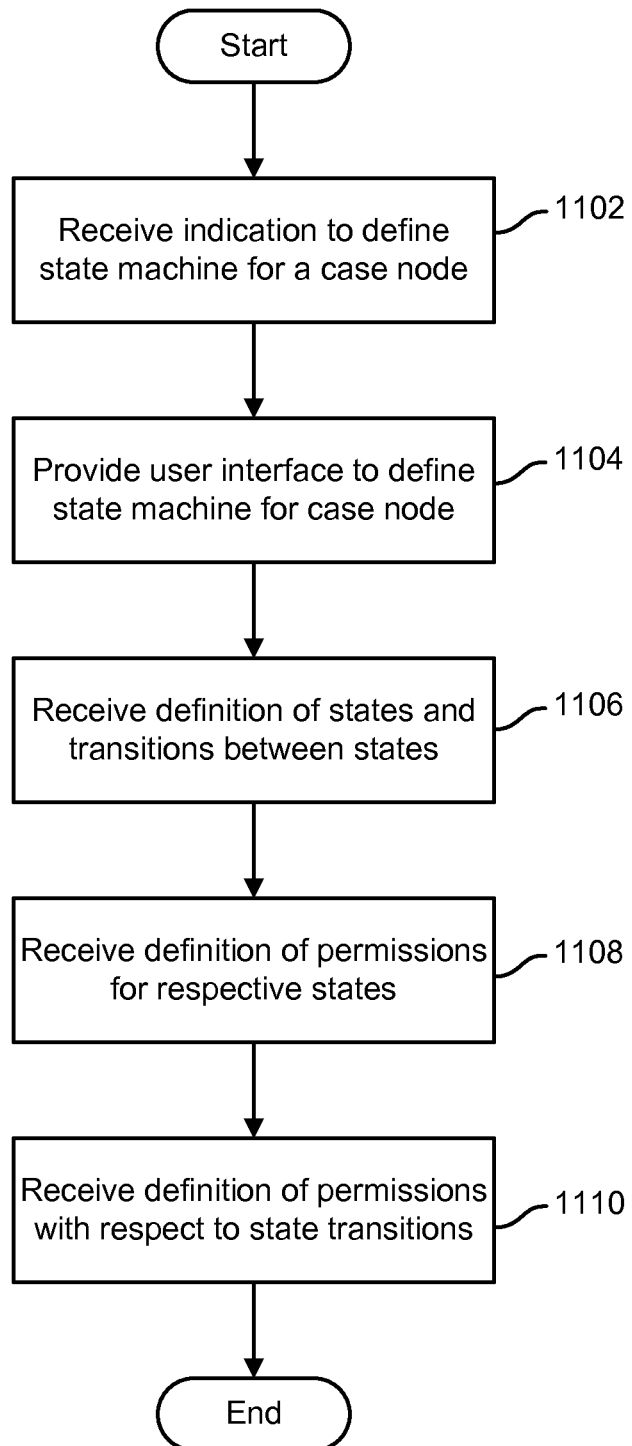
FIG. 11 is a flow chart illustrating an example embodiment of a process to define a state machine for a case node in an embodiment of a case management system.

FIG. 11 is a flow chart illustrating an embodiment of a process to define a state machine for a case node in an embodiment of a case management system. In various embodiments, the process of FIG. 11 may be performed by a case management system, such as case management system 206 of FIGS. 2 and 3. For example, in some embodiments, a case model development component such as case model development module 304 of FIG. 3 may include a development tool and/or feature to enable a state machine to be defined and associated with a case node, using the process of FIG. 11.

In the example shown in FIG. 11, an indication to define a state machine for a case node is received (1102). For example, a developer using a case model definition tool, service, and/or interface may select a case node and provide an input indicating that a state machine is desired to be defined for and associated with the selected node. A developer user interface to define a state machine for the case node is provided (1104). A definition of two or more states and transition(s) between them is received (1106). A definition of permissions associated with the respective states, e.g., who may access content or metadata associated with the case node while the state machine is in that state, is received (1108). A definition of permissions associated with transitions between the respective states, e.g., who may cause each transition to occur, is received (1110). In various embodiments, a state machine defined for a case node using the process of FIG. 11 may be included in the case model definition as stored and deployed, e.g., in a corresponding portion of an XML or other structured data file comprising the case model definition.

Figure 12:
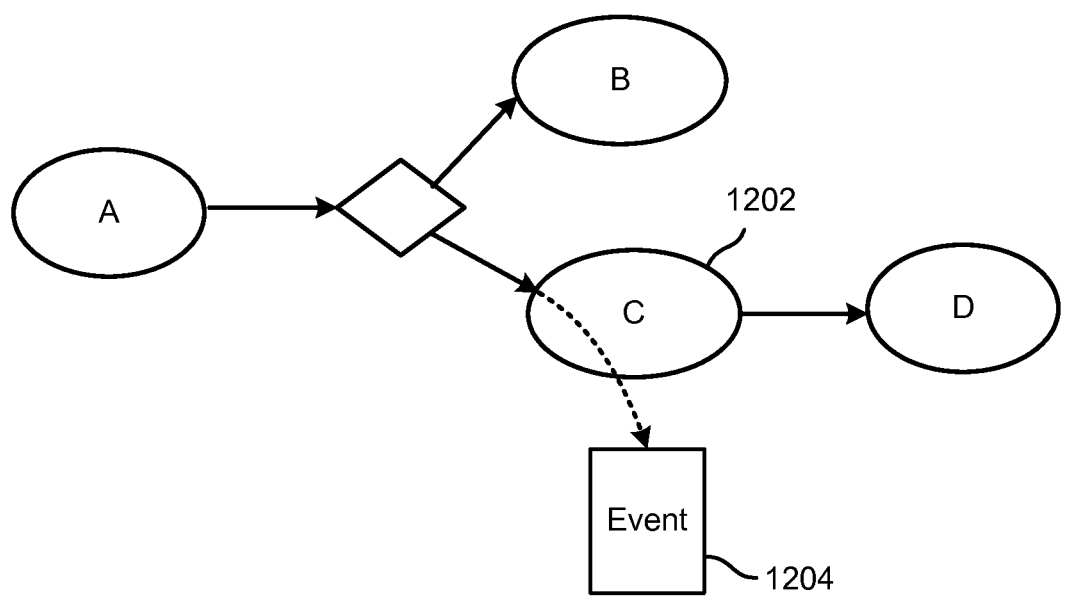
FIG. 12 is a block diagram illustrating an example embodiment of a case management system that triggers business processes based on case node state.

FIG. 12 is a block diagram illustrating an embodiment of a case management system that triggers business processes based on case node state. In various embodiments, a case management system, such as case management system 206 of FIGS. 2 and 3, may trigger a business process by generating an event based at least in part on a case node state machine, as in the example shown in FIG. 12. In some embodiments, a state machine associated with a case node, as in the example shown in FIG. 7, may trigger a business process based on case node state information, as in the example shown in FIG. 12.

In the example shown, a state machine 1200 associated with a case node associated with a node comprising a hierarchical/nested container model defined in a case model definition includes a plurality of states of phases, labeled "A", "B", "C", and "D" in this example. In the example shown, a transition from state "A" to state "C" 1202 causes an event 1204 to be generated and sent to a business process external to state machine 1200, for example to trigger the business process to perform processing in response to the event 1204.

In various embodiments, on any action taken by a user of the case management system or by an external system, e.g., actions resulting in a change phase of the state machine defined for an associated case node (e.g. "Reject a Document")—called case management system "actions" in some embodiments, events are modeled in such a way that if a condition (or expression) based on that particular context is satisfied, a corresponding process is invoked. The process in turn can assign tasks for human attention/action, or execute any system actions such as sending emails based on the context.

User→Case System Action→Event (Condition→Event Action)→Invoke a Process.

For example, in the above example of a manual user input to "Reject a Document", the input may result in a state change, e.g., to a "Reject" state, in a state machine associated with a case node with which the document is associated. Examples of processes that may be triggered based on an event the system generates in response to the "Reject" decision and state machine transition include, without limitation, sending internal and/or external notifications, creating and applying policies to a record of the decision to reject, sending a report to credit reporting agencies, initiating a process to obtain and review a replacement document, etc.

As a further example, assume a case node specific state machine, as in the example shown in FIG. 10. Transition of the state machine from the "open" state to the "pending" state may in some embodiments be associated with uploading of a document (or document identifier of a document) requiring review. In some embodiments, uploading of the document/identifier may trigger the state transition from "open" to "pending", and may trigger (or which in turn may trigger) a business process, such as one to collect all users in a "Reviewer" case role with respect to that particular instance of the case node with which the state machine is associated and send to each an email notifying the user to review the document. In some embodiments, the call to the business process may include as an argument an object identifier usable to retrieve the document, e.g., from a content management system.

Using techniques disclosed herein, in various embodiments data driven mini workflows are able to be modeled, as opposed to earlier very structured predefined processes with lots of predefined activities. In various embodiments, this approach enables one to model ad-hoc actions as opposed to be limited to structured, pre-defined actions.

Figure 13:
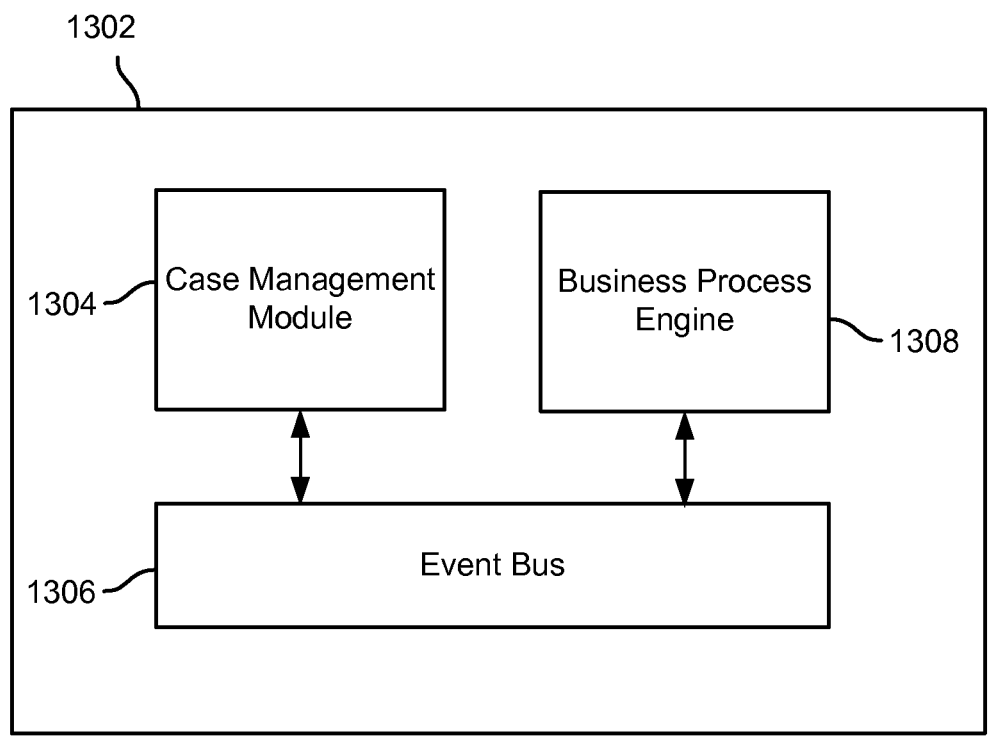
FIG. 13 is a block diagram illustrating an example embodiment of a case management system that generates events to trigger business processes.

FIG. 13 is a block diagram illustrating an embodiment of a case management system that generates events to trigger business processes. In various embodiments, the components in FIG. 13 may be included in a case management system, such as case management system 206 of FIGS. 2 and 3. In some embodiments, the system of FIG. 13 may be used to generate and send events to trigger a business process, such as event 1204 of FIG. 12. In the example shown, case management system 1302 includes a case management module 1304 configured to generate an event based on case management instance processing, e.g., case node state information as in the example shown in FIG. 12, and to transmit such event via event bus 1306. For example, a case model definition may include definition data indicating that the event should be generated and sent, e.g., in connection with a specified state transition within a state machine defined for and associated with a case node per the case model definition. In various embodiments, the trigger that causes the event to be generated and sent, and the form, format, and content of the event, may be specified in the case model definition. At runtime, an event generation agent, module, or service may be invoked, based on the case model definition, to cause the event to be generated and sent upon satisfaction of the event triggering criteria defined in the case model definition, e.g., transition to a specified case node state.

In some embodiments, the event may be addressed to a business process or other destination. In some embodiments, the event is broadcast via event bus 1306 and received by entities that have subscribed to "listen" for and/or otherwise receive the event. In the example shown in FIG. 13, a business process engine 1308 receives events sent by case management module 1304 via event bus 1306. In various embodiments, business process engine 1308 may respond to such events by performing associated business processing. In some embodiments, an event payload data of the event may be used by business process engine 1308 to perform business processing in response to the event.

In some embodiments, business process engine 1308 may be configured to generate responsive events and transmit such responsive events via event bus 1306. For example, business process engine 1308 may transmit a responsive event to indicate that the business processing triggered by receipt of the event received from case management module 1304 has been initiated and/or completed. In some embodiments, a responsive event sent by business process engine 1308 may include an event payload, e.g., a response or result data generated by the business process that was triggered by the event sent by case management module 1304. In some embodiments, case management module 1304 may be configured, e.g., via the case model definition, to respond to responsive events received from a business process triggered by case management module 1304 with respect to a case instance. For example, case node metadata or other values may be updated based on the event payload, or in another example a transition to a destination state of a state machine of the case node may be triggered by a responsive event.

Figure 14:
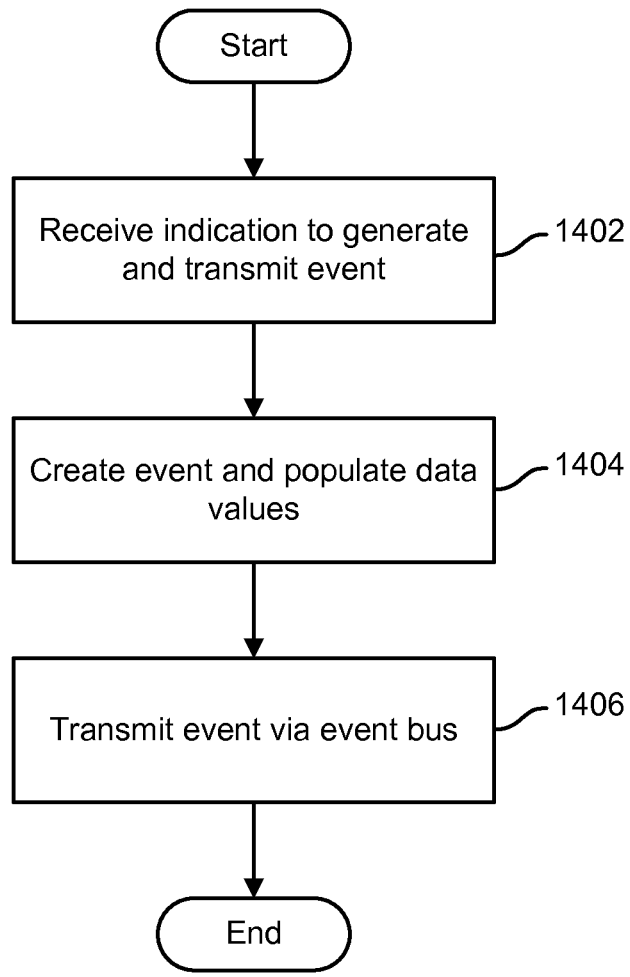
FIG. 14 is a flow chart illustrating an example embodiment of a process to trigger a business process.

FIG. 14 is a flow chart illustrating an embodiment of a process to trigger a business process. In various embodiments, the process of FIG. 14 may be implemented by a case management system, such as case management system 206 of FIG. 206 or case management system 1302 of FIG. 13, and/or a component thereof, such as case management module 1304 of FIG. 13. In the example shown, an indication to generate and transmit an event to trigger a business process is received (1402). For example, occurrence of a state transition or other trigger defined in a case model definition may be detected to have occurred. An event is created and populated with data values (1404), e.g., a case instance data or other payload data, an identifier associated with the case instance, an identifier associate with a business process to be triggered by the event, etc. The event is transmitted via an event bus (or other event or other communication channel) (1406).

A case management system that can be configured, e.g., via a case model definition, to trigger business processes external to a case management instance, and in some embodiments external to the case management system itself, enables external business processes to be invoked as appropriate based on case instance state or other case instance-related information. The approaches disclosed herein in various embodiments enable external business processes to be leveraged by a case management system. The same business processes can be used across different types of case, the respective case model definitions of which may include definition data to invoke the same business process, for example. In addition, decoupling business processes invoked by a case management system on behalf of case instances enables such processes to be updated without requiring changes to the respective case model definitions of the case instances that may be configured to invoke such business processes.

Although the foregoing embodiments have been described in some detail for purposes of clarity of understanding, the technology is not limited to the details provided. There are many alternative ways of implementing the technology. The disclosed embodiments are illustrative and not restrictive.

What is claimed is:

1. A method of controlling processing of a case, the method comprising:
   at a case management system comprising a processor and at least one non-transitory memory containing instructions executable by the processor, causing the processor to:
   initiate a connection between a client device and the case management system using a web service;
   responsive to a request via the web service to create a case instance:
   load a structured data file embodying a case model definition, the case model definition comprising:
   a definition of a hierarchy of case nodes that defines a hierarchical container model, wherein each case node comprises a container;
   a definition of one or more of metadata, behaviors, content, or permissions for non-leaf case nodes in the hierarchy of case nodes;
   a definition of a document to be associated with a case leaf node in the hierarchy of case nodes, the definition of the document including a storage location at which the document is to be stored;
   a state machine definition for the case leaf node in the hierarchy of case nodes;
   an event definition that specifies a form, a format and content of an event to trigger invocation of a computer-implemented process external to the case instance, a trigger condition, and definition data indicating that the event should be generated and sent via an event bus, based on satisfaction of the trigger condition;
   parse the structured data file to instantiate the case instance from the case model definition, the case instance comprising an in-memory instance of a data structure defined in the case model definition to store instance data;
   create a state machine for the case leaf node of the case instance based on the state machine definition;
   determine, from the structured data file, the trigger condition to be monitored for with respect to the instantiated case instance and the computer-implemented process, that is external to the instantiated case instance, that is to be triggered in the event the trigger condition is satisfied; at runtime;
   receive an instance-specific document and associate the instance-specific document with the case leaf node of the case instance;
   detect with respect to the instantiated case instance that the trigger condition is satisfied based on a specified state transition within the state machine for the node of the case instance; and
   in response to detecting that the trigger condition is satisfied based on the specified state transition within the state machine for the case leaf node, create the event in accordance with the event definition in the structured data file embodying the case model definition and dynamically populate the event with a case instance identifier, an identifier of the computer-implemented process to be triggered in response to receipt of the created event at a destination, and a document identifier usable to retrieve the instance-specific document from the storage location; and
   send the created and dynamically populated event via the event bus to the destination to trigger invocation of the computer-implemented process with respect to the instance-specific document.

2. The method of claim 1, wherein the trigger condition is associated with a state of the state machine.

3. The method of claim 2, wherein the trigger condition is associated with the specified state transition of the state machine.

4. The method of claim 3, wherein detecting with respect to the instantiated case instance that the trigger condition is satisfied comprises detecting that the specified state transition has occurred.

5. The method of claim 1, wherein sending the event comprises transmitting the event as part of a broadcast to one or more subscribers.

6. The method of claim 5, wherein the event is transmitted via the event bus.

7. The method of claim 5, wherein the event comprises an event payload associated with the instantiated case instance.

8. The method of claim 1, further comprising providing case instance data associated with the instantiated case instance to the computer-implemented process.

9. The method of claim 1, further comprising receiving result data from the computer-implemented process and adding the result data to case instance data associated with the case instance.

10. The method of claim 9, wherein the result data comprises an output of the computer-implemented process generated in response to triggering of the computer-implemented process with respect to the instantiated case instance.

11. A case management system, comprising:
a storage device configured to store a case model definition associated with a case model;
a processor coupled to the storage device; and
a non-transitory computer readable medium storing a set of computer instructions executable by the processor to:
  initiate a connection between a client device and the case management system using a web service;
  responsive to a request via the web service to create a case instance:
    load a structured data file embodying the case model definition, the case model definition comprising:
      a definition of a hierarchy of case nodes that defines a hierarchical container model, wherein each case node comprises a container and the case model definition;
      a definition of one or more of metadata, behaviors, content, or permissions for non-leaf case nodes in the hierarchy of case nodes;
      a definition of a document to be associated with a case leaf node in the hierarchy of case nodes, the definition of the document including a storage location at which the document is to be stored;
      a state machine definition for the case leaf node in the hierarchy of case nodes; and
      an event definition that specifies a form, a format and content of an event to trigger invocation of a computer-implemented process external to the case instance, a trigger condition, and definition data indicating that the event should be generated and sent via an event bus, based on satisfaction of the trigger condition;
    parse the structured data file to instantiate the case instance based on the case model definition, the case instance comprising an in-memory instance of a data structure defined in the case model definition to store instance data;
    create a state machine for the case leaf node of the case instance based on the state machine definition;
    determine, from the structured data file, the trigger condition to be monitored for with respect to the instantiated case instance and the computer-implemented process, that is external to the instantiated case instance, that is to be triggered in the event the trigger condition is satisfied; at runtime;
    receive an instance-specific document and associate the instance-specific document with the case leaf node of the case instance;
    detect with respect to the instantiated case instance that the trigger condition is satisfied based on a specified state transition within the state machine for the case leaf node of the case instance;
    in response to detecting that the trigger condition is satisfied in the hierarchy of case nodes, create the event in accordance with the event definition in the structured data file embodying the case model definition and dynamically populate the event with a case instance identifier, an identifier of the computer-implemented process to be triggered in response to receipt of the created event at a destination, and a document identifier usable to retrieve the instance-specific document from the storage location; and
    send the created and dynamically populated event via the event bus to the destination to trigger invocation of the computer-implemented process with respect to the instantiated case instance with respect to the instance-specific document.

12. The system of claim 11, wherein the trigger condition is associated with a state of the state machine.

13. The system of claim 11, wherein the set of computer instructions are executable to transmit the event as part of a broadcast to one or more subscribers.

14. The system of claim 11, wherein the set of computer instructions are executable to provide case instance data associated with the instantiated case instance to the computer-implemented process.

15. A computer program product to manage a case in a case management system, the computer program product being embodied in a non-transitory computer readable storage medium and comprising computer instructions for:
  initiating a connection between a client device and the case management system using a web service;
  responsive to a request via the web service to create a case instance;
    loading a structured data file embodying a case model definition, the case model definition comprising:
      a definition of a hierarchy of case nodes that defines a hierarchical container model, wherein each case node comprises a container;
      a definition of one or more of metadata, behaviors, content, or permissions for non-leaf case nodes in the hierarchy of case nodes;
      a definition of a document to be associated with a case leaf node in the hierarchy of case nodes, the definition of the document including a storage location at which the document is to be stored;
      a state machine definition for the case leaf node in the hierarchy of case nodes; and
      an event definition that specifies a form, a format and content of an event to trigger invocation of a computer-implemented process external to the case instance, a trigger condition, and definition data indicating that the event should be generated and sent via an event bus, based on satisfaction of the trigger condition;
    parsing the structured data file to instantiate the case instance based on the case model definition, the case instance comprising an in-memory instance of a data structure defined in the case model definition to store instance data;
    creating a state machine for the case leaf node of the case instance based on the state machine definition;
    determining, from the structured data file, the trigger condition to be monitored for with respect to the instantiated case instance and the computer-implemented process, that is external to the instantiated case instance, that is to be triggered in the event the trigger condition is satisfied;

at runtime:

receiving, via the web service, an instance-specific document and associating the instance-specific document with the case instance;

detecting with respect to the instantiated case instance that the trigger condition is satisfied based on a specified state transition within the state machine for the case leaf node of the case instance;

in response to detecting that the trigger condition is satisfied based on the specified state transition within the state machine for the case leaf node, generating the event in accordance with the event definition in the structured data file embodying the case model definition and dynamically populating the event with a case instance identifier, an identifier of the computer-implemented process to be triggered and a document identifier usable to retrieve the instance-specific document from the storage location; and sending the created and dynamically populated event via the event bus to a destination to trigger invocation of the computer-implemented process with respect to the instance-specific document.

16. The computer program product of claim 15, comprising computer instructions for transmitting the event as part of a broadcast to one or more subscribers.

17. The method of claim 1, wherein the computer-implemented process is external to the case management system.

18. The system of claim 11, wherein the computer-implemented process is external to the case management system.

19. The computer program product of claim 15, wherein the computer-implemented process is external to the case management system.

* * * * *